(12) United States Patent
Wang et al.

(10) Patent No.: US 10,289,848 B2
(45) Date of Patent: May 14, 2019

(54) MALICIOUS SOFTWARE CLUSTERING METHOD EXPRESSED BASED ON TLSH FEATURE

(71) Applicant: SICHUAN UNIVERSITY, Chengdu, Sichuan (CN)

(72) Inventors: Junfeng Wang, Chengdu (CN); Jie Liang, Chengdu (CN); Xiaosong Zhang, Chengdu (CN); Dong Liu, Chengdu (CN); Yong Ma, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 15/645,548

(22) Filed: Jul. 10, 2017

(65) Prior Publication Data
US 2018/0121652 A1 May 3, 2018

(30) Foreign Application Priority Data
Oct. 12, 2016 (CN) .......................... 2016 1 0890389

(51) Int. Cl.
  *G06F 21/00* (2013.01)
  *G06F 21/56* (2013.01)
(52) U.S. Cl.
  CPC ............ *G06F 21/566* (2013.01); *G06F 21/56* (2013.01); *G06F 21/567* (2013.01); *G06F 2221/033* (2013.01)
(58) Field of Classification Search
  CPC .......................................... G06F 21/53–21/568
  See application file for complete search history.

(56) References Cited

U.S. PATENT DOCUMENTS

| 9,876,812 | B1* | 1/2018 | Liu .................... G06F 21/566 |
| 2015/0172303 | A1* | 6/2015 | Humble ............. H04L 63/1408 726/23 |
| 2017/0193229 | A1* | 7/2017 | RoyChowdhury ... G06F 21/564 |

OTHER PUBLICATIONS

Cuckoo Sandbox—Automated Malware Analysis NPL Oct. 8, 2015.*
(Continued)

*Primary Examiner* — Edward Zee
*Assistant Examiner* — Ka Shan Choy
(74) *Attorney, Agent, or Firm* — Oliff PLC (57) ABSTRACT

This invention public a kind of malicious software clustering method expressed based on TLSH feature, which belongs to the analysis and test area of malicious software. Firstly, the Cuckoo Sandbox is used to analyze the malicious software to acquire three kinds of character string features, which are the static feature of the software, resource assess record during operation and API; And then the character strings are disassembled, filtered and sorted and the TLSH algorithm is used to compress them into three groups of feature values with size of 70 characters; Finally the OPTICS algorithm is utilized to realize the automatic classification on the malicious software family. This invention adopts unsupervised learning methods, which does not need the manual tab for the training in advance. The features which are extracted are compressed and expressed by using the TLSH. Under the situation that the feature is not lost, the data dimension is largely lowered and the clustering speed is improved; Through adoption of OPTICS clustering algorithm based on the density, it can not only recognize the cluster of any shape or any number but also largely reduce the influence of the input parameters on the clustering result while improving the efficiency and quality of clustering.

5 Claims, 5 Drawing Sheets

(56) References Cited

OTHER PUBLICATIONS

Cesare et al. "Malwise—An Effective and Efficient Classification System for Packed and Polymorphic Malware." IEEE Transactions on Computers., pp. 1-14, 2013.
Ye et al. "Automatic Malware Categorization Using Cluster Ensemble." ACM., 2010.
Liang et al. "A Behavior-Based Malware Variant Classification Technique." International Journal of Information and Education Technology, vol. 6, No. 4, pp. 291-295, 2016.
Xu et al. "Online Analytical model of massive malware based on feature clusting." Journal on Communications, vol. 34, No. 8, 2013.
Azab et al. "Mining Malware to Detect Variants." Fifth Cybercrime and Trustworthy Computing Conference, pp. 44-53, 2014.

\* cited by examiner

| Test method | Number of clustering | Accuracy | Purity | Precision rate | Recall rate | F-score | Entropy |
|---|---|---|---|---|---|---|---|
| Qihoo360 | 1206 | 0.0067 | 0.9672 | 0.2645 | 0.3103 | 0.1007 | 2.0455 |
| kaspersky | 220 | 0.2472 | 0.8686 | 0.4452 | 0.4634 | 0.3112 | 1.0858 |
| OPTICS(35, 2) | 512 | 0.6339 | 0.9233 | 0.289 | 0.6761 | 0.274 | 1.3757 |
| OPTICS(35, 4) | 221 | 0.5505 | 0.9104 | 0.3194 | 0.6482 | 0.3001 | 0.948 |
| DBSCAN(40, 4) | 208 | 0.4979 | 0.9086 | 0.3587 | 0.5688 | 0.2914 | 0.9518 |
| DBSCAN(45, 4) | 194 | 0.4917 | 0.9041 | 0.3793 | 0.5419 | 0.2973 | 0.9371 |
| DensityPeakClustering(20,50) | | 0.47 | | 0.1459 | 0.4888 | 0.17007 | 2.2649 |
| DensityPeakClustering(70,100) | | 0.3336 | | 0.4752 | 0.2634 | 0.2579 | 0.8938 |
| Kmedoids(66) | 66 | | | 0.2198 | 0.33341 | 0.2122 | 2.0812 |
| Kmedoids(100) | 100 | | | 0.1643 | 0.3739 | 0.1791 | 2.2932 |
| Kmedoids(180) | 180 | | | 0.1246 | 0.4499 | 0.1559 | 2.4215 |
| Kmedoids(200) | 200 | | | 0.1302 | 0.4409 | 0.1644 | 2.3917 |

MALICIOUS SOFTWARE CLUSTERING METHOD EXPRESSED BASED ON TLSH FEATURE

FIELD OF TECHNOLOGY

This invention involves the analysis technology field of malicious software, which is a kind of malicious software clustering method expressed based on TLSH feature in detail.

BACKGROUND TECHNOLOGY

Malicious software refers to the software which is installed and run on the users' computers or other terminals without specific indication to the users or the approval from the users and infracts the legal interest of the users, which is one of the main forms for threatening the information safety. In recent years, the variation of malicious software family increases tremendously. In accordance with the statistics of Internet Security Threat Report issued by Symantec Corporation, there are 31.7 million new variations of the malicious software in the year of 2014 and it reaches to 43.1 million variations in the year of 2015, whose year-on-year growth is 36%. Obviously, manual classification method has not been able to effectively response to such mass data and the automatic classification of the malicious software becomes the hot spot of research.

The research against the malicious software mainly include four aspects as follows: the feature extraction and feature expression of the malicious software, the selection and optimization of clustering algorithm and the clustering result evaluation. Yanfang et al. extracted the sample order sequence and frequency through static analysis method and integrated the clustering methods of tf-idf and k-medoids to realize the classification (Automatic malware categorization using cluster ensemble [A].ACM, 2010.95-104.). Cesare et al. utilized the information entropy to test if the malicious software has been added with shell and unshelled the shelling software. Then they extracted the control flow chart as the sample feature from the generated assembly code and realized the classification of the malicious code through the matching algorithm of similar charts (an effective and efficient classification system for packed and polymorphic malware[J].IEEE Transactions on Computers, 2013, 62(6): 1193-1206.). Xiaolin Xu et al. realized the online automatic analysis model of mass malicious codes which are based on feature clustering. The model is mainly composed of three parts, which are the feature space building, automatic feature extraction and quick clustering analysis. Therein, the feature space building part puts forward the heuristic code feature space building method which is based on the statistics. The automatic feature extraction part puts forward the sample feature vector quantity description method which is composed of API behavior and code section. The quick clustering analysis part puts forward the quick neighborhood clustering algorithm based on the locality sensitive hashing (LSH, locality-sensitive hashing) (Online Analytical Model of Massive Malicious Code Based on Feature Clustering [J]. Journal on Communications, 2013, 34(8):147-153.). Ahmad Azab et al. used K-NN algorithm for clustering through calculating the blurry Hash value of the binary file. Through experimental comparison, it is found that the blurry Hash value generated by using TLSH (The Trend Locality Sensitive Hash) has better effect (Mining Malware To Detect Variants. IEEE Computer Society [J], 2014:44-53). Guanghui Liang et al. Divided the program activities into 6 kinds: file operation, program behavior, registry behavior, network behavior, service behavior and acquisition of system information. And they used 6 tuples (type, name, input parameter, output parameter, returned value, next calling) to describe the knot of a behavior and finally built a behavior relying chain. Through calculating the jaccard distance, they calculated the similarity for clustering (A Behavior-Based Malware Variant Classification Technique[C]. International Journal of Information and Education Technology [J], 2016, 6(4):291-295).

Taken together, these methods have the defects as follows: Firstly, extraction of the features is not comprehensive enough, which does not conduct the extraction with combination of the dynamic and static analysis on the advantages of each one. The expression of features either relies too much on the manpower or conducts deletion and reduction through statistics. At the same time, as the dimension is too high, it will rely on the slow clustering. Secondly, on the selection of clustering algorithm, the use of clustering K-MEANS that is based on the division cannot recognize the noise and cannot conduct the clustering of any shape as well. However, the K-NN algorithm needs manual tab for the training sample. At last, at the aspect of clustering quality evaluation, it is incomplete to evaluate the advantage or disadvantage of the clustering result with the accuracy and purity only. The result of clustering shall be considered from the aspects of clustering (cluster) number, the number of individuals within the cluster and the matching degree with the actual sample, etc.

CONTENTS OF THE INVENTION

According to the problem mentioned above, the target of this invention is to offer a kind of malicious software clustering method expressed based on TLSH feature which can solve the problem of automatic analysis and classification on a large quantity of malicious variation samples and improve the automated analysis on the malicious software family. The technical proposal is as follows:

A kind of malicious software clustering method expressed based on TLSH feature includes the steps as follows:

Step 1: Use Cuckoo Sandbox to analyze the sample and acquire the behavior analysis report;

Step 2: Acquire the static feature of the sample from the behavior analysis report. The static feature of the sample includes DLL information, import and export function information of DLL information and the character string information captured during the analysis process. Sort the information mentioned above in accordance with the dictionary and get a character string.

Step 3: Acquire the resource assess record of the sample from the behavior analysis report. The resource assess record of the sample includes the information as follows: sample file/catalogue, registry, service, DLL and the used mutex. After sorting the information of every category in accordance with the dictionary, combine them to a character string; Divide the mentioned file/catalogue and the registry information with the separator "\\" into the subitems first and then sort them;

Step 4: Acquire the dynamic API of the sample and the API called by these API when loading DLL from the behavior analysis report, and then sort the information mentioned above in accordance with the dictionary to get a character string;

Step 5: Calculate the TLSH values of the character strings gotten from Step 2, Step 3 and Step 4 respectively;

Step 6: Adopt TLSH distance calculation formula to get the TLSH distance of two TLSH values. Take the average value of two minimum values as the final distance between two samples and adopt OPTICS algorithm to conduct clustering on the samples.

For the further step, as the character string gotten from Step 2 has interference item, further filtering treatment is needed, whose method is as follows:

Respectively conduct statistics on the number of the letters occur in the substrings which represent all information of that character string and calculate the information entropy of the substring with the formula as follows:

$$E = -\Sigma_{\varphi=a}^{\varphi=z} P_\varphi \times \log_2 P_\varphi \qquad (1)$$

Therein, $\varphi$ represents letter a-z and $P_\varphi$ represents the probability of $\varphi$ to occur in the substring. The calculation method is to divide the occurring number of $\varphi$ by the length of the substring;

Reserve the substring of the information entropy within the closed interval [2.188, 3.91].

The further algorithm of the mentioned TLSH value is as follows:

1) Process the target character string S with the sliding window with size of 5 characters. Slide one character forward one time and set the contents of a sliding window as: ABCDE; Respectively adopt the Pearson Hash mapping and conduct statistics on the number of 6 buckets, which are ABC, ABD, ABE, ACD, ACE and ADE;
2) Define q1, q2 and q3 as: number of 75% bucket>=q1, number of 50% bucket>=q2 and number of 25% bucket>=q3;
3) Build the head of TLSH Hash, for which there are totally 3 characters: The first character is the checksum of the character string; the second character is expressed by the logarithm L of the length of Character String S as mentioned in Formula (2). len refers to the length of Character String S; the third character is composed of two numbers $q_1\_ratio$ and $q_2\_ratio$ with 16 bits, whose formula is as shown in Formula (3):

$$L = \begin{cases} (\log_{1.5} \text{len}) \bmod 256 & (\text{len} <= 656) \\ (\log_{1.3} \text{len} - 8.72777) \bmod 256 & (\text{len} <= 3199) \\ (\log_{1.1} \text{len} - 62.5472) \bmod 256 & (\text{len} > 3199) \end{cases} \qquad (2)$$

$$\begin{cases} q_1\_ratio = (q_1 * 100/q_3) \bmod 16 \\ q_2\_ratio = (q_2 * 100/q_3) \bmod 16 \end{cases} \qquad (3)$$

4) Build the main body of TLSH Hash: every mapping in 128 mappings generated by Pearson Hash is a key, whose corresponding value is the occurring number of that key; Conduct traversal on every key and generate the corresponding binary digit in accordance with Formula (4). Finally get the Hash value of the main body with size of 32 characters:

$$\text{Value} \begin{cases} \leq q1 & 00 \\ > q1 \text{ and } \leq q2 & 01 \\ > q2 \text{ and } \leq q3 & 10 \\ > q3 & 11 \end{cases} \qquad (4)$$

5) Convert the value gotten in Step 3) and the binary string gotten in Step 4) to 70 hexadecimal numbers and finally get the TLSH value.

The further calculation method of the TLSH distance between X and Y of two TLSH values in Step 6 is as follows:

A) Define mod_diff (a, b, R) as the shortest distance from a to b in the round-robin queue with size of R, that is $$\text{mod\_diff}(a,b,R) = \text{Min}((a-b) \bmod R, (b-a) \bmod R) \qquad (5)$$

B) Calculate the distance between the heads of two TLSH values X and Y:

Respectively calculate the logarithm L of the length of Character String S and the corresponding distances of two 16-bits number $q_1\_ratio$ and $q_2\_ratio$: mod_diff (X.L, Y.L, 256), mod_diff(X.$q_1\_ratio$, Y.$q_1\_ratio$, 256) and mod_diff(X.$q_2\_ratio$, Y.$q_2\_ratio$, 256);

And then calculate the checksum and distance of two TLSH values X and Y: If the checksums of X and Y is equivalent, the distance is 0, otherwise it is 1;

After that, further optimize the values of four distances mentioned above:

$$\text{diff}' = \begin{cases} (\text{diff} - 1) * 12 & \text{diff} > 1 \\ \text{diff} & \text{diff} \leq 1 \end{cases} \qquad (6)$$

Therein, diff is the original value of all distances and diff' is the corresponding optimized value;

So the distance between the heads is the accumulation of four optimized values mentioned above;

C) Calculate the distance of the main bodies for two TLSH values X and Y:

Equally divide 256 binary digits occupied by the main bodies of two TLSH values X and Y into 128 groups from left to right. The binary system of every group is expressed by b0b1; If the binary values applied by a group of X and Y are not equivalent, calculate in accordance with Formula (7), otherwise the distance of that group is 0;

$$(X_{b0b1}, Y_{b0b1}) = \begin{cases} 1100 \text{ or } 0011 & \text{distance is 6} \\ 1101 \text{ or } 0010 & \text{distance is 6} \\ \text{other} & \text{distance is 1} \end{cases} \qquad (7)$$

And then accumulate the corresponding distance of every group to X and Y, from which the value gotten is the distance between the main bodies;

D) The sum of the distance between the heads of two TLSH values X and Y is the TLSH distance between two TLSH values X and Y.

The further method of clustering the samples by adopting OPTICS algorithm in Step 6 is as follows:

The input parameters of the algorithm are the Sample Set D, neighborhood radius and the minimum number MinPt of the points included in that r neighborhood when a point becomes the core object in the r neighborhood. The points which are included in the r neighborhood is the direct density reachable object of that core object;

a) Build ordered queue and result queue;
b) If all points in Sample Set D have been processed, move to Step g); or select an undisposed point which is the core object from Sample Set D, place that core object in the result queue and place the direct density reachable object of that core object in the ordered queue. Such direct density can be sorted in ascending order in accordance with the direct density reachable point;
c) If the ordered queue is empty, skip to Step b). Or take a sample point from the ordered queue;
d) Judge if the sample point is the core object. If not, return to Step c); If yes and that point is not in the result queue, place it in the result queue and conduct the next step;
e) Find out all direct density reachable objects of that core object and conduct traversal on these points. Judge if they have existed in the result queue. If yes, skip it and continue to deal with the next point, otherwise move to the next step;
f) If that direct density reachable point has existed in the ordered queue and at this time, the new reachable distance is shorter than the old reachable distance, replace the old reachable distance with the new one and reorder the ordered queue;
g) Output and save the ordered sample points of the result queue;
h) Take out the point in order from the result queue. If the reachable distance of that point is not larger than the neighborhood radius r, that point belongs to the current category. Otherwise conduct the next step;
i) If the core distance of that point is bigger than the neighborhood radius r, that point is marked as the noise. Otherwise that point belongs to the new category.

The advantageous effects of this invention are:
1) The sample feature extraction and analysis process of this invention are conducted automatically. This invention adopts unsupervised learning methods, which does not need the manual tab for the training in advance;
2) Through adoption of OPTICS clustering algorithm based on the density, it can not only recognize the cluster of any shape or any number but also largely reduce the influence of the input parameters on the clustering result while improving the efficiency and quality of clustering;
3) This invention can let the user get to know the clustering situation more intuitively and make corresponding adjustment in time with visualization output result;
4) The features extracted by this invention are compressed and expressed by using the TLSH. Under the situation that the feature is not lost, the data dimension is largely lowered and the clustering speed is improved; At the same time, the distance value calculated by TLSH can reach 1000 above, making the distinction degrees between different families more obvious.

SPECIFIC IMPLEMENTATION METHOD

The attached figure and specific implementation process are combined to further explain this invention in detail.

The feature of a kind of malicious software clustering method expressed based on TLSH feature includes the steps as follows:
Step 1: use the virtual sandbox (Cuckoo Sandbox) to analyze the sample to acquire the behavior analysis report.
Step 2: Acquire the static feature of the sample from the behavior analysis report, which includes DLL (Dynamic Link Library) information and its import and export function information and the character string information captured during the analysis process. Sort these information in accordance with the dictionary (establish the dictionary tree) and combine them into a character string.
Step 3: Acquire the resource assess record of the sample during operation process from the behavior analysis report. These records can be divided into 6 categories as sample file/catalogue, registry, service, DLL and the used mutex. After sorting the information of every category in accordance with the dictionary, combine them to a character string. Therein, for the two kinds of information for the file/catalogue and the registry, they shall be divided with the separator "\\" into the subitems first and then conduct the operation.
Step 4: Acquire the dynamic API (Application Programming Interface) of the sample and the API called by these API when loading the DLL from the behavior analysis report, and then sort the information mentioned above in accordance with the dictionary to get a character string;
Step 5: Calculate the TLSH values of the character strings gotten from Step 2, Step 3 and Step 4 respectively;
Step 6: Adopt OPTICS (Ordering Points to identify the clustering structure) algorithm to cluster. The TLSH distance calculation formula is adopted in the distance measurement method therein. Get the TLSH distance to all feature values of two TLSH values and then take the average value of two minimum values as the final distance between two samples.

In Step 2 mentioned above, as the quantity of the extracted character string information is large and the interference items exist, the filtering treatment is needed.

The character string information refers to some captured output information during the operation process of the procedure such as the character strings with actual significance like "Implementation succeeds" and "Operation fails" and the interference items without actual significance like "*/*s231ddaaa" and etc, which need to be filtered and sorted together.

Description of the Method is as Follows:
Respectively conduct statistics on the occurring number of the letters in the substrings that represent all information of that character string and calculate the information entropy of the substrings with the formula as follows:
And reserve the substring of the information entropy within the closed interval [2.188, 3.91].

$$E = -\Sigma_{\varphi=a}^{\varphi=z} P_\varphi \times \log_2 P_\varphi \qquad (1)$$

Therein, $\varphi$ represents letter a-z and $P_\varphi$ represents the probability of $\varphi$ to occur in the substring. The calculation method is to divide the occurring number of $\varphi$ by the length of the substring;

In Step 5 mentioned, description of the calculation method to TLSH value is as follows:
1) Process the target character string S with the sliding window with size of 5 characters. (Slide one character forward one time). Set the contents of a sliding window as: ABCDE; Respectively adopt the Pearson Hash mapping and conduct statistics on the number of 6 buckets, which are ABC, ABD, ABE, ACD, ACE and ADE;

2) After conducting statistics on the number of all buckets of character string S, define q1, q2 and q3 as: number of 75% bucket>=q1, number of 50% bucket>=q2 and number of 25% bucket>=q3;
3) Build the head of TLSH Hash, for which there are totally 3 characters: The first character is the checksum (Checksum) of the character string; The second character is expressed by the logarithm L of the length of Character String S as mentioned in Formula (2). Set the length of S as len; the third character is composed of two numbers $q_1\_ratio$ and $q_2\_ratio$ with 16 bits, whose formula is as shown in Formula (3):

$$L = \begin{cases} (\log_{1.5} len) \bmod 256 & (len <= 656) \\ (\log_{1.3} len - 8.72777) \bmod 256 & (len <= 3199) \\ (\log_{1.1} len - 62.5472) \bmod 256 & (len > 3199) \end{cases} \quad (2)$$

$$\begin{cases} q_1\_ratio = (q_1 * 100 / q_3) \bmod 16 \\ q_2\_ratio = (q_2 * 100 / q_3) \bmod 16 \end{cases} \quad (3)$$

4) Build the main body of TLSH Hash: the Pearson Hash will generate 128 mappings. Every mapping is a key (Key), whose corresponding value (Value) is the occurring number of that key. Conduct traversal on every key and generate the corresponding binary digit in accordance with Formula (4). Finally get the Hash value of the main body with size of 32 characters:

$$Value = \begin{cases} \leq q1 & 00 \\ > q1 \text{ and } \leq q2 & 01 \\ > q2 \text{ and } \leq q3 & 10 \\ > q3 & 11 \end{cases} \quad (4)$$

5) Convert the value gotten in Step 3) and the binary string gotten in Step 4) to 70 hexadecimal numbers and finally get the TLSH value.

In Step 6 mentioned, the calculation method of the TLSH distance between X and Y of two TLSH values is as follows:
a) Define mod_diff(a, b, R) as the shortest distance from a to b in the round-robin queue with size of R, which is gotten with Formula (5).

$$\text{mod\_diff}(a,b,R) = \text{Min}((a-b) \bmod R, (b-a) \bmod R) \quad (5)$$

b) Calculate the distance between the heads firstly. Respectively calculate the corresponding distances mod_diff(X.L, Y.L, 256), mod_diff(X.L, Y.L, 256) and mod_diff(X.$q_2$_ratio, Y.$q_2$_ratio, 256) of L, $q_1$_ratio and $q_2$_ratio. And then calculate the distance of checksum for X and Y. If the checksums of X and Y are equivalent, the distance is 0, otherwise it is 1. And then further optimize the value of four distances mentioned above:

$$diff' = \begin{cases} (diff - 1) * 12 & diff > 1 \\ diff & diff \leq 1 \end{cases} \quad (6)$$

Therein, diff is the original value of all distances and diff' is the corresponding optimized value; so the distance between the heads is the accumulation of four optimized values mentioned above.
d) Calculate the distance of the main bodies for two TLSH values X and Y:

Equally divide 256 binary digits occupied by the main bodies of two TLSH values X and Y into 128 groups from left to right. The binary system of every group is expressed by b0b1; If the binary values applied by a group of X and Y are not equivalent, calculate in accordance with Formula (7), otherwise the distance of that group is 0; Then accumulate the corresponding distance of every group of X and Y, the value gotten is the distance between the main bodies.

$$(X_{b0b1}, Y_{b0b1}) = \begin{cases} 1100 \text{ or } 0011 & \text{distance is } 6 \\ 1101 \text{ or } 0010 & \text{distance is } 6 \\ \text{other} & \text{distance is } 1 \end{cases} \quad (7)$$

d) The TLSH distance between X and Y is the sum of the distance between the heads and the distance between the main bodies.

The description of the OPTICS algorithm in Step 6 mentioned is as follows:
The input parameters of the algorithm are the Sample Set D, neighborhood radius r and the minimum number MinPt of the points included in that r neighborhood when a point becomes the core object in the r neighborhood.
a) Build two queue, ordered queue and result queue. Therein, the ordered queue is used to store the core object and the direct density reachable object of that core object (i.e. the points within area of the core object r) and is sorted in ascending order in accordance with the reachable distance; The result queue is used to store the output and processing order of the sample points.
b) If all points in Sample Set D have been processed, the algorithm finishes. Otherwise, select an undisposed point which is the core object from Sample Set D, place that core point in the result queue and place the direct density of that core point in the ordered queue. Sort these direct density reachable points in ascending order accordance with the reachable distance.
c) If the ordered queue is empty, skip to Step b). Or take the first sample point (i.e. the sample point with shortest reachable distance) from the ordered queue for expansion;
d) Judge if the expansion point is the core object first. If not, return to Step c); If yes and the point is not in the result queue, place it in the result queue and then conduct the next step;
e) Find out all direct density reachable objects of that core object and conduct traversal on these points. Judge if they have existed in the result queue. If yes, skip it and continue to deal with the next point, otherwise move to the next step;
f) If that direct density reachable point has existed in the ordered queue and at this time, the new reachable distance is shorter than the old reachable distance, replace the old reachable distance with the new one and reorder the ordered queue. If that direct density reachable point does not exist in the ordered queue, insert that point and reorder the ordered queue.
g) After finishing treatment of the sample output and save the ordered sample points of the result queue.
h) Take out the point in order from the result queue, if the reachable distance of that point is not larger than the neighborhood radius r, it means that the point belongs to the current category; If the reachable distance of that point is larger than the neighborhood radius r, conduct the next step.

i) If the core distance of that point is bigger than the neighborhood radius r, that point is marked as the noise. Otherwise that point belongs to the new category and moves to Step h) till the result queue is empty.

Figure 1:
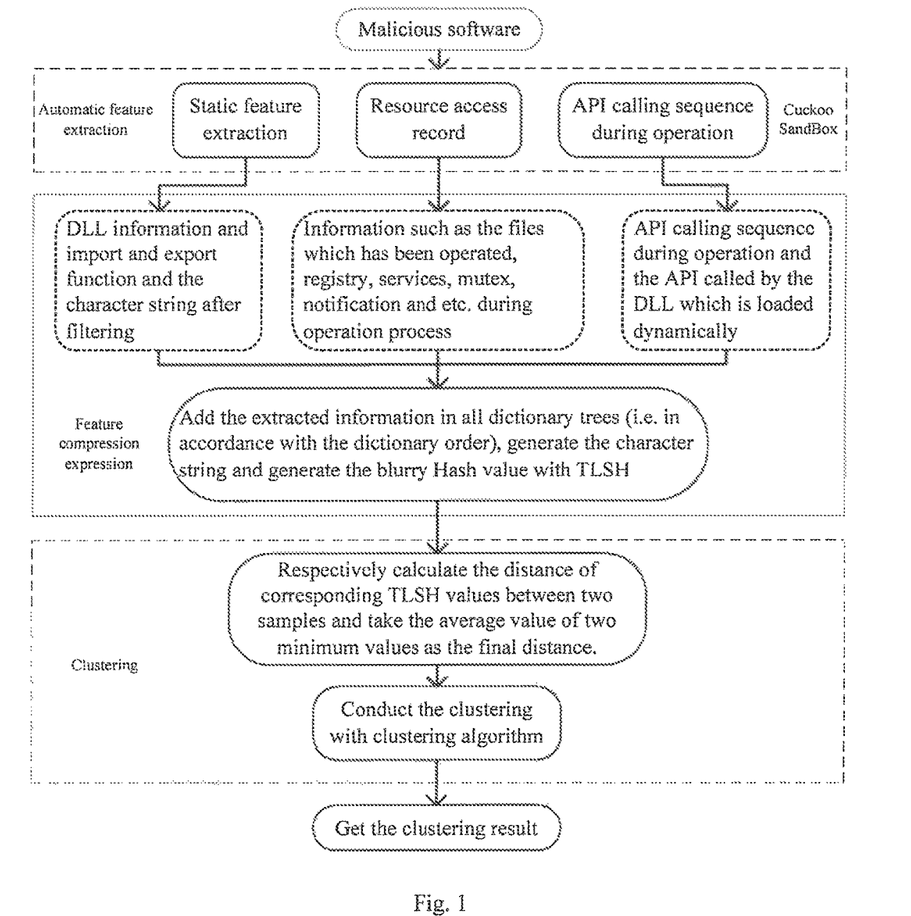
FIG. 1 is the overall flow chart of the malicious software clustering method expressed based on TLSH feature.
Figure 2:
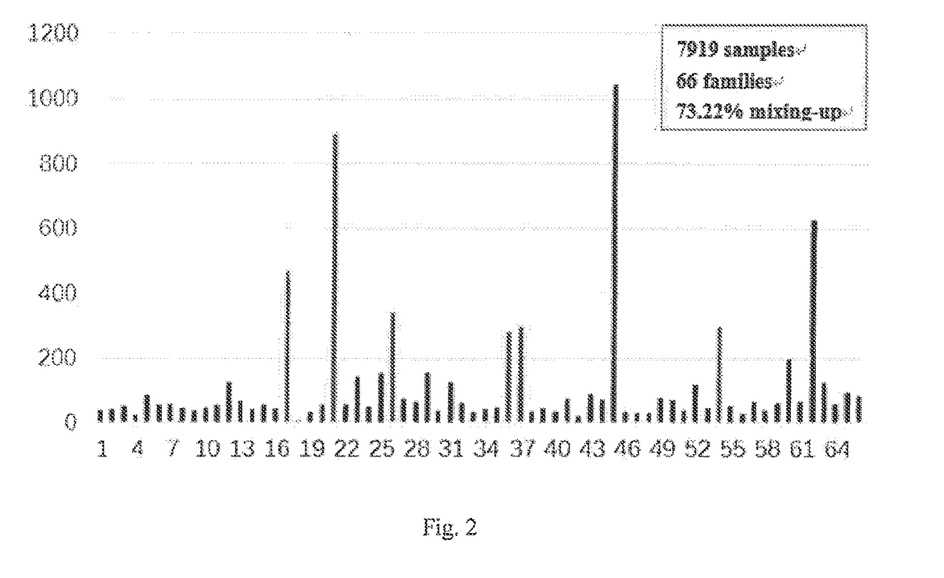
FIG. 2 shows the distribution of the sample family to the malicious software which is adopted by this invention.
Figure 5:
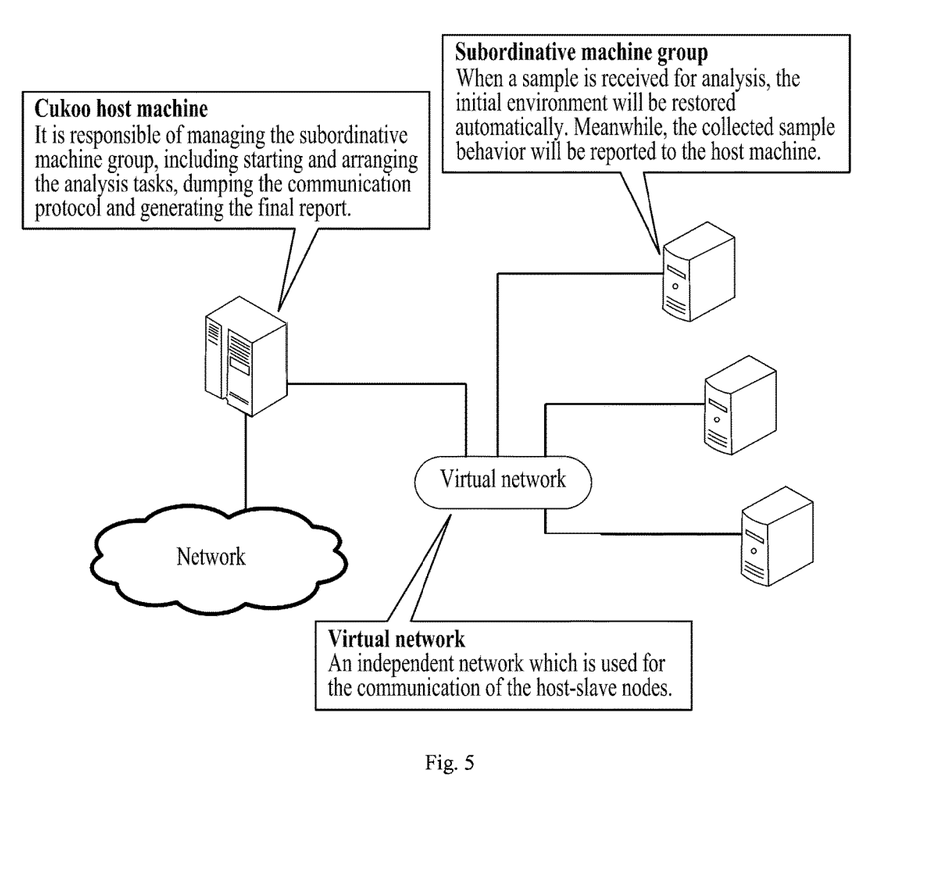
FIG. 5 is the environmental deployment structure chart of this invention.

FIG. 1 shows the overall flow of this invent. Firstly, establish the test environment in accordance with the environmental deployment figure as shown in FIG. 5. Therein, Cuckoohost is the control site, which is responsible of the management on the virtual machine and dispatch on the analysis tasks. And Guests can generate the test environment by using the virtual machine management software such as VMware, Xen, VirtualBox and so on. After the analysis task is submitted, Cuckoohost will arrange the unique ID to that task and then generate the report under/storage/analysis/ID catalogue, whose contents include crash dump file, TCP/UDP data, the behavior record during operation of the software and information like the screenshot, static feature of the software and etc.

Figure 4:
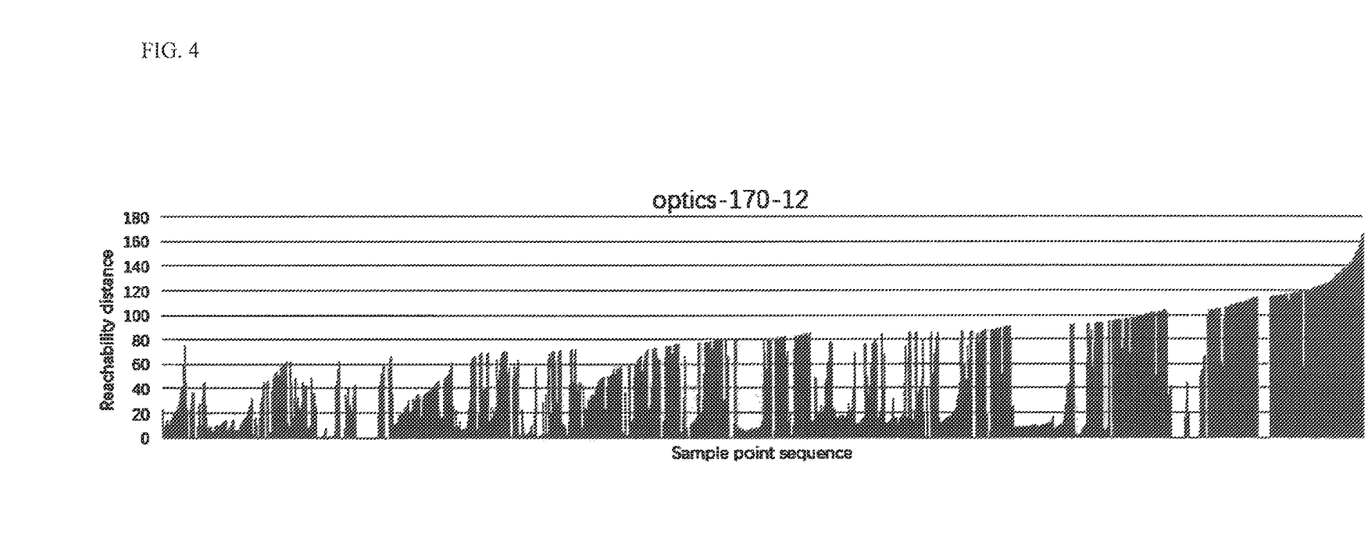
FIG. 4 is the visualization display of the output result of this method.

After the analysis finishes, a report file of Json form will be generated. Process the Json file and extract the main features (static feature, resource assess record, API during operation) and compress three groups of features with TLSH to get the feature value and then selection of the suitable clustering algorithm to cluster. OPTICS algorithm is adopted for this invention. FIG. 4 shows the clustering result output by that method. Axis Y represents the reachable distance of a point. Every trough of wave seen in the figure can be regarded as a cluster (family). If Y value is too high, it means that the point maybe the noise. The description about reachable distance and core distance is as follows:

Set $x \in D$. For the given parameters E and MinPts, the mathematical definition of the core cd(x) with smallest neighborhood radius as x which makes x become the core point is:

$$cd(x) = \begin{cases} \text{undefined}, & \text{if } |N_\in(x)| < \text{MinPts} \\ d(x, N_\in^{\text{MinPts}}(x)), & \text{if } |N_\in(x)| \geq \text{MinPts} \end{cases}$$

Therein, d(x, y) means the distance between x and y; $N_\in^i(x)$ means the node closes to the i of node x in the set $N_\in(x)$; $|N_\in(x)|$ means the number of elements in the set $N_\in(x)$.

Set x, $y \in D$. The mathematical definition of the reachable distance rd(y, x) of y about x is:

$$rd(y, x) = \begin{cases} \text{undefined}, & \text{if } |N_\in(x)| < \text{MinPts} \\ \text{MAX}\{cd(x), d(x, y)\}, & \text{if } |N_\in(x)| \geq \text{MinPts} \end{cases}$$

In the parameters of the experimental comparison, the accuracy means the probability of a sample which is marked correctly after clustering; Precision rate and recall rate respectively mean the agglomeration degree of cluster and the overall matching degree of manual marks in the clustering results as shown in Formula (8) and (9); F-Score means the harmonic mean of the precision rate and recall rate as shown in Formula (10); Entropy means the severity of mixing up to the clustering result.

For $\forall x \in D$, set $L_x$ as the cluster including x in the clustering result; $C_x$ means the cluster including x in the result of the manual marks. So:

$$\text{Precision rate: } P(x) = \frac{|L_x \cap C_x|}{|C_x|} \quad (8)$$

$$\text{Recall rate: } R(x) = \frac{|L_x \cap C_x|}{|L_x|} \quad (9)$$

$$\text{F-Score: } F(x) = \frac{2 \times P(x) \times R(x)}{P(x) + R(x)} \quad (10)$$

Set the clustering algorithm to divide the data set D into K sets $D_i$ without intersection of each other. In manual marks, M sets $C_j$ are divided. The calculation method of the entropy (D) in the clustering result is as shown in Formula (11).

$$\text{entropy}(D) = -\sum_{i=1}^{K} \frac{|D_i|}{|D|} \times \sum_{j=1}^{M} P_i(C_j) \times \log_2 P_i(C_j) \quad (11)$$

Therein, $|D_i|$ means the number of elements of that cluster; $P_i(C_j)$ means the proportion of the elements which belong to catalogue $C_j$.

Figure 3:
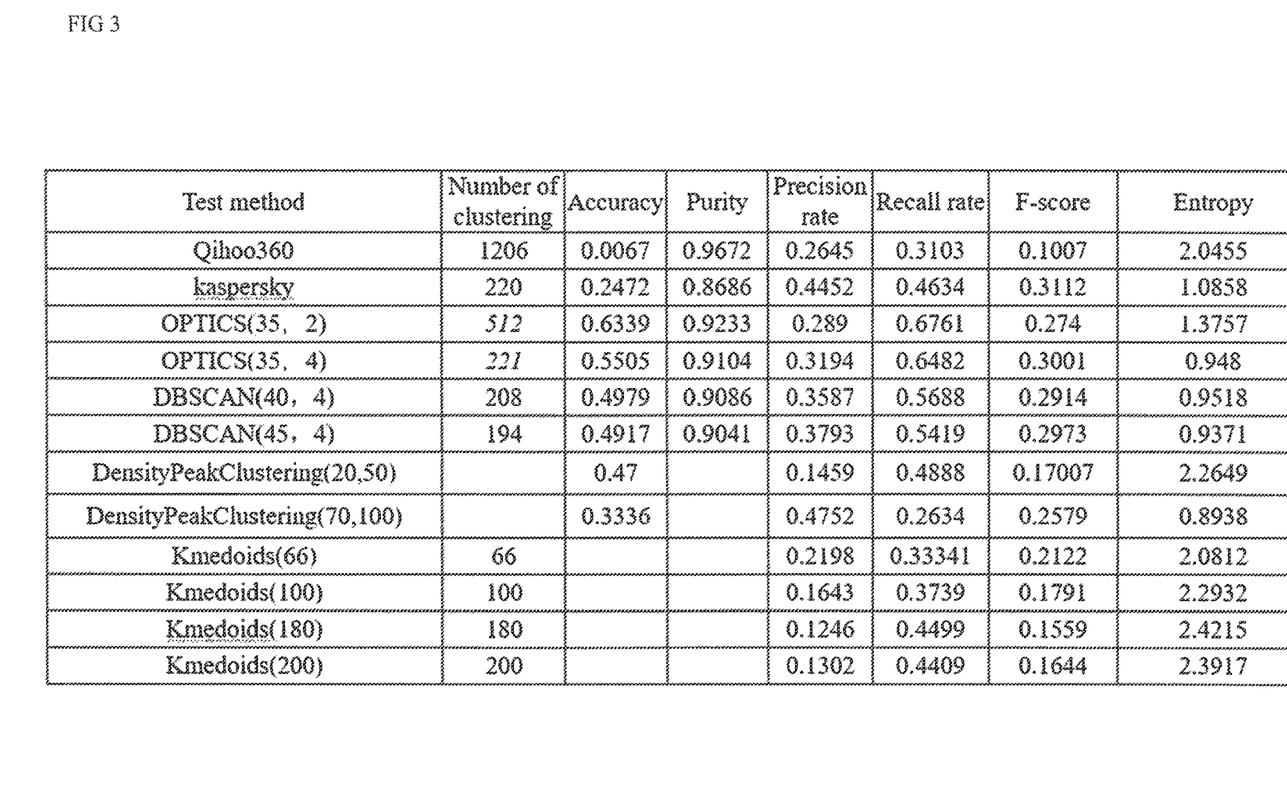
FIG. 3 shows the output result comparison between this method with other antivirus program and clustering algorithm.

Distribution of the testing samples adopted in this invention is as shown in FIG. 1, in which there are totally 7919 samples, being divided into 66 families. The samples with add-shell/mixing-up treatment occupy 73.22%. The newest version (July of 2016) of Kaspersky and more than 360 antivirus engines are adopted in the contrast experiment for comparison. Also, several kinds of classic clustering algorithms existing currently are added for comparison. The experiment result is as shown in FIG. 3, from which we can see that the clustering result of Kaspersky is better than that of 360. However, in the clustering algorithm, the effect of OPTICS algorithm which is adopted in this invention is the best. And under the situation that other experiment data does not have big difference, its accuracy and recall rate improves 159% and 39% respectively being compared with that of Kaspersky.

What is claimed is:

1. A malicious software clustering method expressed based on TLSH (The Trend Locality Sensitive Hash) feature, the method including the steps as below:

Step 1: using a Cuckoo Sandbox to analyze a sample and acquire a behavior analysis report;

Step 2: acquiring static characteristics of the sample from the behavior analysis report, the static characteristics of the sample including: DLL (Dynamic Link Library) information, import and export function information of the DLL information and character string information captured during the analysis process in Step 1; and sorting the static characteristics in accordance with a dictionary to get a first character string;

Step 3: acquiring a resource access record of the sample from the behavior analysis report, the resource access record of the sample including the information as follows: sample files/catalogue, registry information, service, DLL and used mutex (Mutual Exclusion Object); sorting the information of every category in accordance with the dictionary and combining the sorted information to obtain a second character string; separating the files/catalogue and registry information into sub-items with a separator "\\" and then sorting the files/catalogue and registry information;

Step 4: acquiring dynamic API (Application Programming Interface) of the sample and API called by the DLL loaded from the behavior analysis report, and sorting the dynamic API and the called API in accordance with the dictionary to get a third character string;

Step 5: calculating TLSH values of the first character string, the second character string and the third character string, respectively; and Step 6: adopting TLSH distance calculation formula to get a TLSH distance of two TLSH values; taking an average value of two minimum TLSH values as a final distance of two samples; and adopting OPTICS (Ordering Point To Identify Clustering Structures) algorithm to cluster the samples and obtain a clustering result.

2. The method according to claim 1, wherein the first character string gotten from Step 2 has interference item, the method further comprising:

conducting statistics on numbers of letters occurring in substrings that represent all information in a character string respectively and calculating information entropy of the substrings with the formula as follows:

$$E = -\Sigma_{\varphi=a}^{\varphi=z} P_\varphi \times \log_2 P_\varphi \qquad (1)$$

where $\varphi$ refers to the letter a-z, and $P_\varphi$ refers to occurrence probability of letter $\varphi$ in the substring, the calculation dividing the number of $\varphi$ that occurs by a length of a substring;

reserving the substring of the information entropy within a closed interval [2.188, 3.91].

3. The method according to claim 1, further comprising:

a) using a sliding window with size of 5 characters to process a target character string S, sliding one character forward one time and setting contents of one sliding window as:

ABCDE;

respectively adopting Pearson Hash mapping and conducting statistics on the number of 6 buckets ABC, ABD, ABE, ACD, ACE and ADE;

b) defining q1, q2 and q3 as: number of 75% bucket>=q1, number of 50% bucket>=q2 and number of 25% bucket>=q3;

c) building a head of TLSH Hash including a first character, a second character and a third character, the first character being checksum of the character string; the second character being expressed by logarithm L of the length of Character String S in Formula (2), where len refers to the length of Character String S; the third character being composed of two numbers $q_1$_ratio and $q_2$_ratio with 16 bits, as shown in Formula (3):

$$L = \begin{cases} (\log_{1.5} \text{len}) \bmod 256 & (\text{len} <= 656) \\ (\log_{1.3} \text{len} - 8.72777) \bmod 256 & (\text{len} <= 3199) \\ (\log_{1.1} \text{len} - 62.5472) \bmod 256 & (\text{len} > 3199) \end{cases} \qquad (2)$$

$$\begin{cases} q_1\_\text{ratio} = (q_1 * 100/q_3) \bmod 16 \\ q_2\_\text{ratio} = (q_2 * 100/q_3) \bmod 16 \end{cases} \qquad (3)$$

d) building a main body of TLSH Hash, wherein every mapping in 128 mappings generated by Pearson Hash is a key, whose corresponding value is the number occurring of that key; conducting traversal on every key and generating corresponding binary digit in accordance with Formula (4); and getting the Hash value of the main body with size of 32 characters:

$$\text{Value} \begin{cases} \leq q1 & 00 \\ > q1 \text{ and} \leq q2 & 01 \\ > q2 \text{ and} \leq q3 & 10 \\ > q3 & 11 \end{cases} \qquad (4)$$

5) converting the second character string gotten in Step 3) and the third character string gotten in Step 4) to 70 hexadecimal numbers and getting a TLSH value.

4. The method according to claim 3, wherein step 6 comprises:

a) defining mod_diff(a, b, R) as a shortest distance from a to b in a round-robin queue with size of R as follows:

$$\text{mod\_diff}(a,b,R) = \text{Min}((a-b) \bmod R, (b-a) \bmod R) \qquad (5)$$

b) calculating a distance between the heads of two TLSH values X and Y by respectively calculating the logarithm L of the length of Character String S and the corresponding distances of two 16-bits number $q_1$_ratio and $q_2$_ratio: mod_diff(X.L, Y.L, 256), mod_diff(X.$q_1$_ratio, Y.$q_1$_ratio, 256) and mod_diff(X.$q_2$_ratio, Y.$q_2$_ratio, 256); and then calculating the checksum and distance of two TLSH values X and Y wherein if the checksums of X and Y are equivalent, the distance is 0, otherwise the distance is 1;

thereafter, further optimizing the values of the distances calculated in step b) and step c):

$$\text{diff}' = \begin{cases} (\text{diff} - 1) * 12 & \text{diff} > 1 \\ \text{diff} & \text{diff} \leq 1 \end{cases} \qquad (6)$$

where, diff is the original value of all distances and diff' is the corresponding optimized value, thereby the distance between the heads is an accumulation of the optimized values, c) calculating a distance of the main bodies for two TLSH values X and Y as follows:

equally dividing 256 binary digits occupied by the main bodies of two TLSH values X and Y into 128 groups from left to right, with a binary system of every group being expressed by b0b1; wherein, binary values applied by a group of X and Y are not equivalent, calculate the distance of the group in accordance with Formula (7), otherwise the distance of that group is 0;

$$(X_{b0b1}, Y_{b0b1}) = \begin{cases} 1100 \text{ or } 0011 & \text{distance is } 6 \\ 1101 \text{ or } 0010 & \text{distance is } 6 \\ \text{other} & \text{distance is } 1 \end{cases} \qquad (7)$$

and then accumulating the corresponding distance of every group to X and Y to obtain the distance between the main bodies, d) adding the distance between the heads of two TLSH values X and Y to obtain the TLSH distance between two TLSH values X and Y.

5. The method according to claim 1, wherein input parameters in step 6 are points in a sample set, a neighborhood radius and a minimum number MinPt of the points are included in an r neighborhood when a point becomes a core object in the r neighborhood, the points which are included in the r neighborhood are direct density reachable points and are a direct density reachable object of that core object, step 6 further comprising:

a) building ordered queue and result queue;

b) if all points in the sample set have been processed, moving to Step g); otherwise, selecting an undisposed point which is a core object from the sample set, placing that core object in the result queue and placing the direct density reachable object of that core object in the ordered queue, direct density being sorted in ascending order in accordance with a direct density reachable point;

c) if the ordered queue is empty, skipping to Step b), otherwise, taking a sample point from the ordered queue;

d) judging if the sample point is the core object, if not, returning to Step c);

if yes and the sample point is not in the result queue, placing the sample point in the result queue and conducting the next step;

e) finding out all direct density reachable objects of that core object and conducting traversal on corresponding sample points by judging if a sample point has existed in the result queue, if yes, skipping this sample point and continuing to deal with the next sample point, otherwise moving to step f) below;

f) if a direct density reachable point has existed in the ordered queue and a new reachable distance is shorter than an old reachable distance, replacing the old reachable distance with the new reachable distance and reorder the ordered queue;

g) outputting and saving the ordered sample points of the result queue;

h) taking out the sample point in order from the result queue, wherein if the reachable distance of that sample point is not larger than a neighborhood radius r, include that sample point in a current category; otherwise, conduct the step i) below;

i) if a core distance of that sample point is larger than the neighborhood radius r, marking that point as noise; otherwise, designating that point to the current category.

* * * * *